US012770542B2

(12) United States Patent
Seo et al.

(10) Patent No.: US 12,770,542 B2
(45) Date of Patent: Oct. 20, 2026

(54) DISPLAY APPARATUS AND CONTROL METHOD THEREOF

(71) Applicant: SAMSUNG ELECTRONICS CO., LTD., Suwon-si (KR)

(72) Inventors: Youngjo Seo, Suwon-si (KR); Sanghoon Oh, Suwon-si (KR); Youngkook Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 490 days.

(21) Appl. No.: 18/076,569

(22) Filed: Dec. 7, 2022

(65) Prior Publication Data

US 2023/0120655 A1 Apr. 20, 2023

Related U.S. Application Data

(63) Continuation of application No. PCT/KR2022/013180, filed on Sep. 2, 2022.

(30) Foreign Application Priority Data

Oct. 18, 2021 (KR) ........................ 10-2021-0138786

(51) Int. Cl.
*G09G 3/20* (2006.01)
*G06T 5/92* (2024.01)

(52) U.S. Cl.
CPC ................. *G09G 3/20* (2013.01); *G06T 5/92* (2024.01); *G06T 2207/20084* (2013.01);
(Continued)

(58) Field of Classification Search
None
See application file for complete search history.

(56) References Cited

U.S. PATENT DOCUMENTS 9,098,906 B2 8/2015 Brulls et al.
9,928,020 B2 3/2018 Jang
(Continued)

FOREIGN PATENT DOCUMENTS

CN 110581956 A 12/2019
CN 113455013 A 9/2021
(Continued)

OTHER PUBLICATIONS

Extended European Search Report dated Oct. 16, 2024, issued by the European Patent Office in European Application No. 22883766.2.

(Continued)

*Primary Examiner* — Bernard Krasnic
(74) *Attorney, Agent, or Firm* — Sughrue Mion, PLLC

(57) ABSTRACT

A display apparatus includes a display; a communication interface including circuitry; and a processor configured to: based on a plurality of contents received from a plurality of source devices through the communication interface in a multi-view mode, obtain a first frame including each of the received plurality of contents in different areas of the display, obtain a second frame to which High Dynamic Range (HDR) processing is applied by performing tone mapping based on first luminance information on each of the plurality of contents included in the first frame, and control the display to display the second frame.

14 Claims, 9 Drawing Sheets

(52) U.S. Cl.
CPC .............. *G06T 2207/20208* (2013.01); *G09G 2320/0686* (2013.01); *G09G 2340/14* (2013.01); *G09G 2360/16* (2013.01); *G09G 2370/20* (2013.01)

(56) References Cited

U.S. PATENT DOCUMENTS

| | | | | |
|---|---|---|---|---|
| 10,275,865 | B2 | 4/2019 | Nam | |
| 10,638,105 | B2 | 4/2020 | Luo et al. | |
| 10,757,385 | B2 | 8/2020 | Rusanovskyy et al. | |
| 10,939,158 | B2 | 3/2021 | Oh | |
| 11,107,201 | B2 | 8/2021 | Park et al. | |
| 11,361,506 | B2 | 6/2022 | Su et al. | |
| 11,908,109 | B1 * | 2/2024 | Rauen | G06T 3/18 |
| 2015/0301777 | A1 | 10/2015 | Jang | |
| 2016/0381398 | A1 * | 12/2016 | Saxena | H04N 21/816 348/39 |
| 2017/0330312 | A1 | 11/2017 | Nam | |
| 2018/0063500 | A1 | 3/2018 | Rusanovskyy et al. | |
| 2018/0330674 | A1 * | 11/2018 | Baar | H05B 45/20 |
| 2018/0376194 | A1 | 12/2018 | Oh | |
| 2019/0020852 | A1 | 1/2019 | Bak et al. | |
| 2019/0287450 | A1 * | 9/2019 | Urabe | G09G 3/20 |
| 2019/0335146 | A1 * | 10/2019 | Hisano | G06T 5/92 |
| 2020/0258203 | A1 | 8/2020 | Takagi | |
| 2021/0150812 | A1 | 5/2021 | Su et al. | |
| 2021/0304702 | A1 * | 9/2021 | Sato | G06T 5/92 |
| 2025/0174205 | A1 * | 5/2025 | Pieri | G09G 3/3413 |

FOREIGN PATENT DOCUMENTS

| | | | | |
|---|---|---|---|---|
| EP | 3 742 432 | A1 | 11/2020 | |
| JP | 2013-140361 | A | 7/2013 | |
| JP | 2021-114708 | A | 8/2021 | |
| KR | 10-2010-0059544 | A | 6/2010 | |
| KR | 10-2013-0076678 | A | 7/2013 | |
| KR | 10-1557027 | B1 | 10/2015 | |
| KR | 1020150121915 | A | 10/2015 | |
| KR | 1020170129004 | A | 11/2017 | |
| KR | 10-1809639 | B1 | 1/2018 | |
| KR | 101881370 | B1 | 7/2018 | |
| KR | 1020190000762 | A | 1/2019 | |
| KR | 10-2019-0039958 | A | 4/2019 | |
| KR | 10-2020-0004210 | A | 1/2020 | |
| KR | 1020200142035 | A | 12/2020 | |
| WO | WO-2021030506 | A1 * | 2/2021 | G06F 18/23 |

OTHER PUBLICATIONS

Communication dated Dec. 3, 2024, issued by the Korean Patent Office in Korean Application No. 10-2021-0138786.

International Search Report (PCT/ISA/210) and Written Opinion (PCT/ISA/237) dated Dec. 22, 2022 issued by the International Searching Authority in International Application No. PCT/KR2022/013180.

Office Action issued Aug. 4, 2025 by the Korean Patent Office for KR Patent Application No. 10-2021-0138786.

Communication issued on Apr. 30, 2026 by the Intellectual Property India in Indian Patent Application No. 202417016825.

Communication issued on May 18, 2026 by the Korean Ministry of Intellectual Property (MOIP) in Korean Patent Application No. 10-2021-0138786.

Communication issued on Jul. 24, 2026 by the China National Intellectual Property Administration in Chinese Patent Application No. 202280053881.6.

* cited by examiner

FIG. 8

| GRADUATION \ APL(%) | 0 | 10 | 20 | 30 | ··· | 90 | 100 |
|---|---|---|---|---|---|---|---|
| 0 | 0 | 0 | 0 | 0 | ··· | 0 | 0 |
| 1 | 1 | 1 | 1 | 1 | ··· | 1 | 1 |
| ⋮ | ⋮ | ⋮ | ⋮ | ⋮ | ⋰ | ⋮ | ⋮ |
| 254 | 900 | 900 | 900 | 900 | ··· | 200 | 140 |
| 255 | 1000 | 1000 | 1000 | 1000 | ··· | 250 | 160 |

DISPLAY APPARATUS AND CONTROL METHOD THEREOF

CROSS-REFERENCE TO RELATED APPLICATION(S)

This application is a bypass continuation of International Application No. PCT/KR2022/013180, filed on Sep. 2, 2022, which is based on and claims priority to Korean Patent Application No. 10-2021-0138786, filed on Oct. 18, 2021, in the Korean Intellectual Property Office, the disclosures of which are incorporated by reference herein in their entireties.

BACKGROUND

1. Field

The disclosure relates to a display apparatus and a control method thereof, and more particularly, a display apparatus providing a multi-view mode and a luminance control method thereof.

2. Description of Related Art

With the development of electronic technology, various types of electronic apparatuses have been developed and distributed. For example, display apparatuses such as mobile devices, televisions, or the like have developed rapidly in recent years.

Display apparatuses tend to have a higher resolution and a larger size, and the large-sized display apparatus may not only output one content, but may simultaneously output a plurality of content.

However, each of the plurality of contents simultaneously output by the display apparatus may have different resolutions, contrast ratios, etc., and thus there was a problem that the user may be provided with an unnatural screen that may cause deterioration, distortion, or increase eye strain.

For example, when one frame in which High Dynamic Range (HDR) content and Standard Dynamic Range (SDR) content are mixed among a plurality of contents is output, there was a problem in that a maximum output luminance of the HDR content is relatively high, and a maximum output luminance of the SDR content is relatively low, thereby providing an unnatural screen to the user.

SUMMARY

The disclosure may address the problems described above, and according to an aspect of the disclosure, there is provided a display apparatus for outputting a plurality of contents after performing image processing by a frame unit, and a method for controlling thereof.

According to an aspect of the disclosure, a display apparatus includes: a display; a communication interface including circuitry; and a processor configured to: based on a plurality of contents received from a plurality of source devices through the communication interface in a multi-view mode, obtain a first frame including each of the received plurality of contents in different areas of the display, obtain a second frame to which High Dynamic Range (HDR) processing is applied by performing tone mapping based on first luminance information on each of the plurality of contents included in the first frame, and control the display to display the second frame.

The processor may be further configured to: identify setting information indicating whether the HDR processing is set in the multi-view mode, based on the setting information indicating that the HDR processing is set, obtain the second frame to which the HDR processing is applied, and based on the setting information indicating that the HDR processing is not set, identify whether at least one of the plurality of contents is Standard Dynamic Range (SDR) content, and based on identifying that at least one of the plurality of contents is SDR content, obtain a third frame including a plurality of SDR contents.

The processor may be further configured to, based on the setting information indicating that the HDR processing is not set and each of the plurality of contents is HDR content, obtain a fourth frame including a plurality of HDR contents.

The processor may be further configured to obtain second luminance information from metadata included in at least one HDR content among the plurality of contents received from the plurality of source devices, perform tone mapping on the at least one HDR content based on the second luminance information, obtain the first frame including the at least on HDR content on which the tone mapping is performed, and obtain the second frame by applying the HDR processing based on the first luminance information to the first frame.

The processor may be further configured to, based on the setting information indicating that each of the plurality of contents received from the plurality of source devices is Standard Dynamic Range (SDR) content, obtain the first frame including each of the received SDR contents in different areas, and obtain the second frame to which the HDR processing is applied by performing tone mapping based on the first luminance information on each of the SDR contents included in the first frame.

The processor may be further configured to, based on the multi-view mode being switched to a full-view mode, identify a type of content selected by a user among the plurality of contents received from the plurality of source devices, based on the type of content being HDR content, obtain second luminance information from metadata included in the HDR content, perform the tone mapping on the HDR content based on the second luminance information, and control the display to display the HDR content on which the tone mapping is performed.

The processor may be further configured to, based on the multi-view mode being switched to a full-view mode, identify a type of content selected by a user among the plurality of contents received from each of the plurality of source devices, and based on the type of content being Standard Dynamic Range (SDR) content, control the display to display the frame corresponding to the SDR content.

The processor may be further configured to identify the first luminance information corresponding to a third luminance information of the first frame from among a plurality of predetermined luminance information, and obtain the second frame to which HDR processing is applied by performing the tone mapping on each of the plurality of content included in the first frame based on the identified first luminance information.

The processor may be further configured to obtain the second frame to which the HDR processing is applied by inputting the first frame to a neural network model, and the neural network model may be a model learned to output a frame on which tone mapping is performed based on the luminance information corresponding to input luminance information of an input frame.

According to an aspect of the disclosure, a method of controlling a display apparatus includes: based on a plurality of contents being received from a plurality of source devices in a multi-view mode, obtaining a first frame including each of the received plurality of contents in different areas of a display of the display apparatus; obtaining a second frame to which High Dynamic Range (HDR) processing is applied by performing tone mapping based on first luminance information on each of the plurality of contents included in the first frame; and displaying the second frame.

The obtaining the second frame includes: identifying setting information indicating whether the HDR processing is set in the multi-view mode, based on the setting information indicating that the HDR processing is set, obtaining the second frame to which the HDR processing is applied; and based on the setting information indicating that the HDR processing is not set, identifying whether at least one of the plurality of contents is Standard Dynamic Range (SDR) content, and based on identifying that at least one of the plurality of contents is SDR content, obtaining a third frame including a plurality of SDR contents.

The obtaining the output frame may include, based on the setting information indicating that the HDR processing is not set and each of the plurality of contents is HDR content, obtaining a fourth frame including a plurality of HDR contents.

The obtaining the second frame may include obtaining second luminance information from metadata included in at least one HDR content among the plurality of contents received from the plurality of source devices; performing tone mapping on the at least one HDR content based on the second luminance information; obtaining the first frame including the at least one HDR content on which the tone mapping is performed; and obtaining the second frame by applying the HDR processing based on the first luminance information to the first frame.

The obtaining the first frame may include: based on the setting information indicating that each of the plurality of contents received from the plurality of source devices is SDR content, obtaining the first frame including each of the received SDR content in different areas, and the obtaining the second frame may include obtaining the second frame to which HDR processing is applied by performing tone mapping based on the first luminance information on each of the SDR contents included in the first frame.

The method may further include: based on the multi-view mode being switched to a full-view mode, identifying a type of content selected by a user among the plurality of contents received from the plurality of source devices; based on the type of content being HDR content, obtaining second luminance information from metadata included in the HDR content; performing the tone mapping on the HDR content based on the second luminance information; and displaying the HDR content on which the tone mapping is performed.

According to one or more embodiments of the disclosure, when a single screen including both HDR content and SDR content is output, a natural screen may be provided by adjusting an output luminance range of each of the plurality of content to be the same or similar.

Also, according to one or more embodiments, a frame may be output by performing image processing or tone mapping in units of one frame including a plurality of content in the multi-view mode, which simultaneously outputs a plurality of content with different HDR support, or the like.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a view illustrating a tone mapping curve according to an embodiment.

DETAILED DESCRIPTION

Hereinafter, the disclosure will be described in detail with reference to the accompanying drawings.

Terms used in the disclosure are selected as general terminologies currently widely used in consideration of configurations and functions of the one or more embodiments of the disclosure, but can be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The terms "have", "may have", "include", and "may include" used in the exemplary embodiments of the disclosure indicate the presence of corresponding features (for example, elements such as numerical values, functions, operations, or parts), and do not preclude the presence of additional features.

The term "at least one of A or/and B" means only A, only B, or both A and B.

The term such as "first" and "second" used in various exemplary embodiments may modify various elements regardless of an order and/or importance of the corresponding elements, and does not limit the corresponding elements.

When an element (e.g., a first element) is "operatively or communicatively coupled with/to" or "connected to" another element (e.g., a second element), an element may be directly coupled with another element or may be coupled through the other element (e.g., a third element).

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Also, the term "user" may refer to a person who uses an electronic apparatus or an apparatus (e.g., an artificial intelligence (AI) electronic apparatus) that uses the electronic apparatus.

Hereinafter, various embodiments of the disclosure will be described in more detail with reference to the accompanying drawings.

Figure 1:
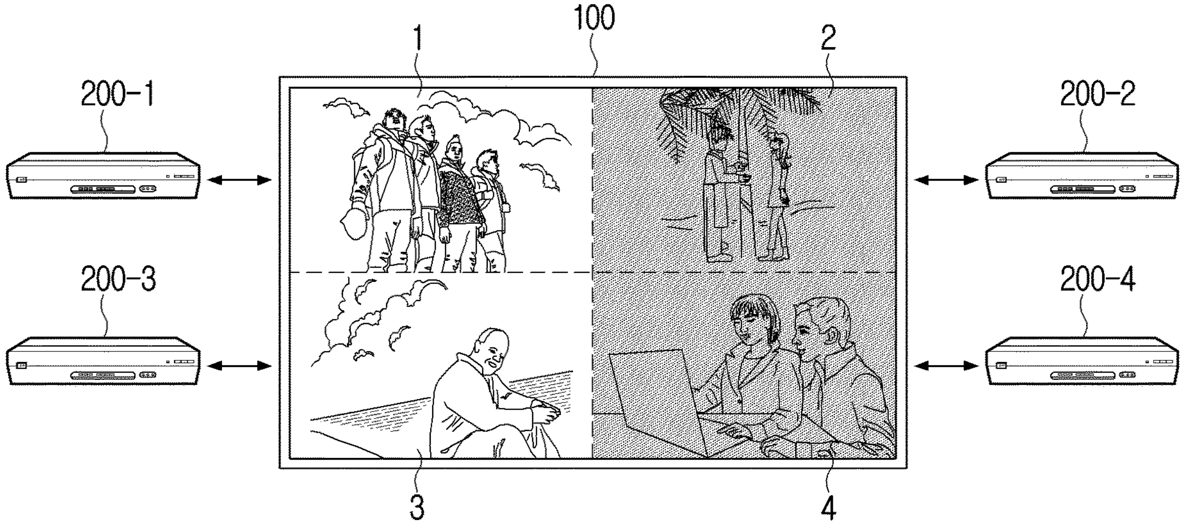
FIG. 1 is a view illustrating a multi-view mode according to an embodiment.

FIG. 1 is a view illustrating a multi-view mode according to an embodiment.

As illustrated in FIG. 1, the display apparatus 100 may be implemented as a television (TV), and may be implemented in various devices having a display function, such as a video wall, a large format display (LFD), a digital signage, a digital information display (DID), a projector display, etc., but may be applicable without limitation. In addition, the display apparatus 100 may be implemented in various types of a liquid crystal display (LCD), an organic light-emitting diode (OLED), a liquid crystal on silicon (LCoS), a digital light processing (DLP), a quantum dot (QD) display panel, and a quantum dot light-emitting diodes (QLED), a micro light-emitting diodes (μLEDs), mini LEDs, or the like. The display apparatus 100 may be implemented as a touch screen combined with a touch sensor, a flexible display, a rollable display, a three-dimensional (3D) display, a display in which a plurality of display modules are physically connected, or the like.

As the display apparatus 100 gradually increases in size and/or the display apparatus 100 receives content from each of a plurality of source apparatuses, the display apparatus 100 may simultaneously display a plurality of content as shown in FIG. 1.

For example, the display apparatus 100 may provide a picture in picture (PIP) mode, a picture by picture (PBP) mode, and the like. For example, according to the PIP mode, the display apparatus 100 may display a first content 1 received from a first source apparatus 200-1 on an entire screen, and display a second content 2 received from a second source apparatus 200-2 by overlapping the second content 2 on one area within the entire screen on which the first content 1 is displayed. Here, a position and size of one area may be fixed, and the position and size of one area may be adjusted according to a user command or the like.

According to another embodiment, in the PBP mode, the display apparatus 100 may display the first content 1 received from the first source apparatus 200-1 on one area within the entire screen, and display the second content 2 received from the second source apparatus 200-2 on its remaining area within the entire screen. Here, the position and size of one area and the remaining area may be fixed, and the position and size may be adjusted according to a user command or content.

Hereinafter, a mode in which the display apparatus 100 displays a plurality of contents within the entire screen, such as the PIP mode, PBP mode, or the like, will be collectively referred to as a multi-view mode for convenience of description.

In addition, FIG. 1 has been described, for convenience of description, on the assumption that the display apparatus 100 divides the entire screen into four and displays content in each of four different areas, but this is only an example and is not limited thereto.

For example, the display apparatus 100 may divide the entire screen into two and display content in each of two different areas.

Also, the size (or ratio) of each of the different areas may be the same or different according to various embodiment, and the disclosure is not limited thereto.

Referring to FIG. 1, the display apparatus 100 may receive content from each of n source apparatuses 200, where n is an integer. The display apparatus 100 may obtain a frame including each content received in each of n different areas by dividing the entire screen by n.

For example, the display apparatus 100 may obtain a frame including each content received from first to fourth source apparatuses 200-1, . . . , 200-4 by positioning the first content 1 received from the first source device 200-1 in a first area, positioning the second content 2 received from the second source device 200-2 in a second area, positioning a third content 3 received from a third source device 200-3 in a third area, and positioning a fourth content 4 received from a fourth source device 200-4 in a fourth area.

For convenience of description, the number of source devices 200 that provide content and the number of different areas in which content is provided within the entire screen are unified, but this is only an example and is not limited thereto. For example, the display apparatus 100 may receive content from each of the four source apparatuses 200, divide the entire screen into two, and display the first content 1 and the second content 2 in each of two different areas. For another example, the display apparatus 100 may display the first content 1 and the fourth content 4 in each of two different areas based on a user command or the like.

The display apparatus 100 according to an embodiment of the disclosure may output the obtained frame, or may output the obtained frame after performing image processing. Image processing by a frame unit according to various embodiments of the disclosure will be described below.

For example, it may be assumed that the display apparatus 100 receives content from a plurality of source devices and displays the received content without image processing by a frame unit. Since specifications of each of the plurality of source devices, a format of the provided content, resolution, and contrast (e.g., whether High Dynamic Range (HDR) or Standard Dynamic Range (SDR)) are different, when the display apparatus 100 simultaneously outputs different contents in the multi-view mode, the user may feel that the content may not uniform (e.g., the first content received from the first source device is relatively bright, and second content received from the second source device is relatively dark).

The display apparatus 100 according to an embodiment of the disclosure may perform image processing in frame units based on a frame including each of the plurality of contents, and output the image processing. Accordingly, even when the content received from the plurality of source devices is simultaneously provided, the user may feel that a unified plurality of contents (for example, a contrast ratio of the first content received from the first source device and a contrast ratio of the second content received from the second source device are the same or similar) is provided.

FIG. 1 illustrates an embodiment in which each of the plurality of source devices 200 is the same or similar for convenience of description, but this is an example and the disclosure is not limited thereto. The source device 200 may be implemented as various types of electronic devices. For example, each of the plurality of source devices 200 may be implemented as various types of devices that provide a Blu-ray player, a digital versatile disc (DVD) player, a streaming content output device, a set-top box, a cloud server, an Over-the-top (OTT) media service, a PC, a console (video game console), or the like. The display apparatus 100 may output an image by performing image processing according to various embodiments of the disclosure, or may provide it to the other electronic device having a display.

Figure 2:
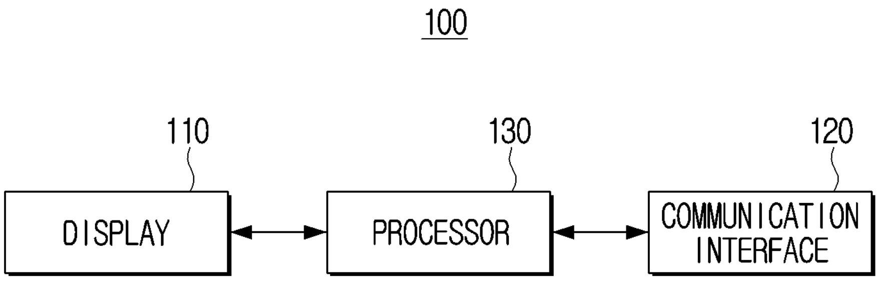
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

According to FIG. 2, the display apparatus 100 includes a display 110, a communication interface 120, and a processor 130.

The display 110 may be implemented as a display including a self-luminous element or a display including a non-light-emitting device and a backlight. For example, it may be implemented in various types of displays such as liquid crystal display (LCD), organic light emitting diodes (OLED) displays, light emitting diodes (LED), micro LED, Mini LED, plasma display panel (PDP), quantum dot (QD) displays, quantum dot light-emitting diodes (QLEDs), or the like. In the display 110, a driving circuit, a backlight unit, or the like, which may be implemented in the form of an a-si TFT, a low temperature poly silicon (LTPS) TFT, an organic TFT (OTFT), or the like may also be included. The display 110 may be implemented as a touch screen combined with a touch sensor, a flexible display, a rollable display, a three-dimensional (3D) display, a display in which a plurality of display modules are physically connected, or the like.

The communication interface 130 receives various data. For example, the communication interface 130 may receive various data such as content from at least one source device 200, an external storage medium (e.g., USB memory), an external server (e.g., web hard drive) through a communication method such as an AP-based Wi-Fi (Wireless LAN network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, or the like.

The communication interface 130 according to an embodiment of the disclosure may receive content by performing wired or wireless communication with each of the plurality of source devices 200. According to an embodiment, the communication interface 130 may be implement by a circuitry including one or more electronic components.

The processor 30 according to an embodiment may control the overall operation of the display apparatus 100.

According to an embodiment, the processor 130 may be implemented as a digital signal processor (DSP), a microprocessor, or a time controller (T-CON) that processes a digital image signal. However, it is not limited thereto, and may include one or more of a central processing unit (CPU), microcontroller unit (MCU), micro processing unit (MPU), controller, application processor (AP), or communication processor (CP), ARM processor, and artificial intelligence (AI) processor or may be defined with a corresponding term. In addition, the processor 130 may be implemented as a system on chip (SoC) or large scale integration (LSI) in which a processing algorithm is embedded, or may be implemented in a field programmable gate array (FPGA) form. The processor 130 may perform various functions by executing computer executable instructions stored in the memory 120.

According to an embodiment, when content is received from each of the plurality of source devices 200 through the communication interface in the multi-view mode, the processor 130 may obtain a frame including each received content in different areas.

A detailed description thereof will be described with reference to FIG. 3.

Figure 3:
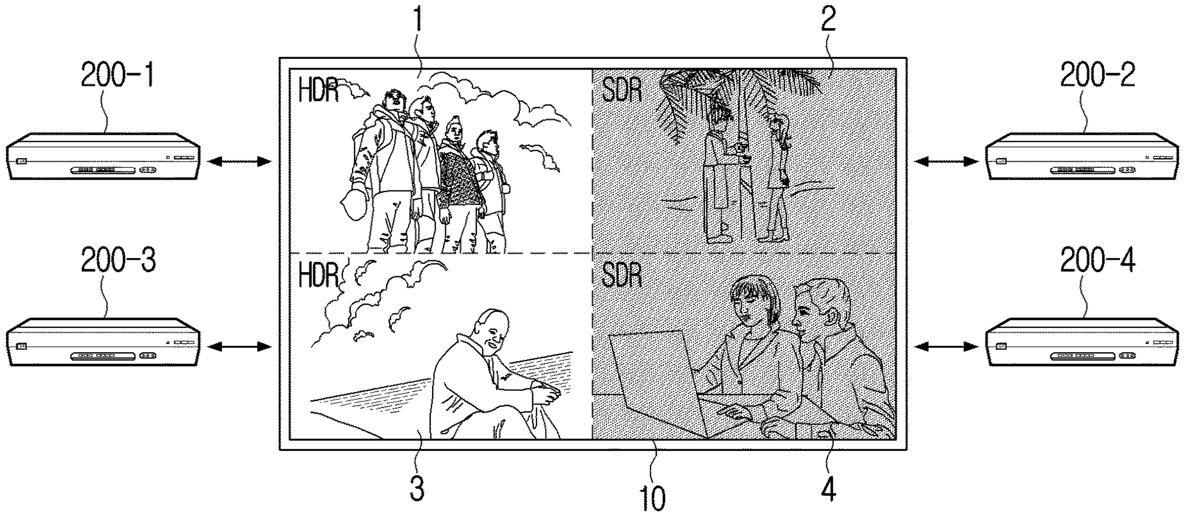
FIG. 3 is a view illustrating HDR and SDR content according to an embodiment.

FIG. 3 is a view illustrating HDR and SDR content according to an embodiment.

When high dynamic range (HDR) content is received from the source device 200, the processor 130 according to an embodiment of the disclosure may apply HDR processing to the HDR content by using metadata included in the HDR content, and provide the content through the display 110.

Here, the HDR content may refer to content having increased peak luminance and color depth compared to prior Standard Dynamic Range (SDR) content. For example, HDR content may be expressed with a brightness of about 1,000 nits, and since it has a 10-bit color depth, graduation expression may be expressed with an integer of 0 to 1023. Specific numbers are examples for convenience of description and are not limited thereto. For example, HDR content may have a color depth of 8 bits or 12 bits.

According to an embodiment, when content is received from each of the plurality of source devices 200 in the multi-view mode, the processor 130 may obtain a frame 10 including each received content in different areas.

For example, the processor 130 may receive the frame 1—including first content 1, second content 2, third content 3 and fourth content 4 when receiving the first content 1 from the first source device 200-1, the second content 2 from the second source device 200-2, the third content 3 from the third source device 200-3 and the fourth content 4 from the fourth source device 200-4, as shown in FIG. 3.

Here, the frame 10 may be a configuration obtained by the processor 130 before the display apparatus 100 outputs, and may have a different configuration from an output frame to be described below.

Referring to FIG. 3, the first content 1, second content 2, third content 3 and the fourth content 4 included in the frame 10 may be expressed (or displayed) with different brightness. For example, if the first content 1 is HDR content, the processor 130 may perform tone mapping on the first content 1 using metadata included in the HDR content and apply HDR processing. In this case, the brightness of the first content 1 may be expressed in a range of up to 1,000 nits.

According to an embodiment, if the second content 1 is standard dynamic range (SDR) content, the processor 130 may position the SDR content in the second area without separate processing (e.g., HDR processing). However, unlike the first content 1, the second content 2, that is, the SDR content, may display brightness in a range of up to 200 to 400 nits. The specific numerical values are examples and are not limited thereto.

Accordingly, as shown in FIG. 3, when the display apparatus 100 simultaneously provides a plurality of contents, the user may feel that HDR content (e.g., the first contents 1, etc.) are relatively bright, and SDR content (e.g., the first contents 1) are relatively dark.

If the difference in luminance between the contents continues, user's fatigue may be increased and the user may perceive that the contents are distorted.

Accordingly, the processor 130 according to an embodiment of the disclosure may obtain the frame 10, and may obtain an output frame by performing image processing on the obtained frame 10 by a frame unit.

Figure 4:
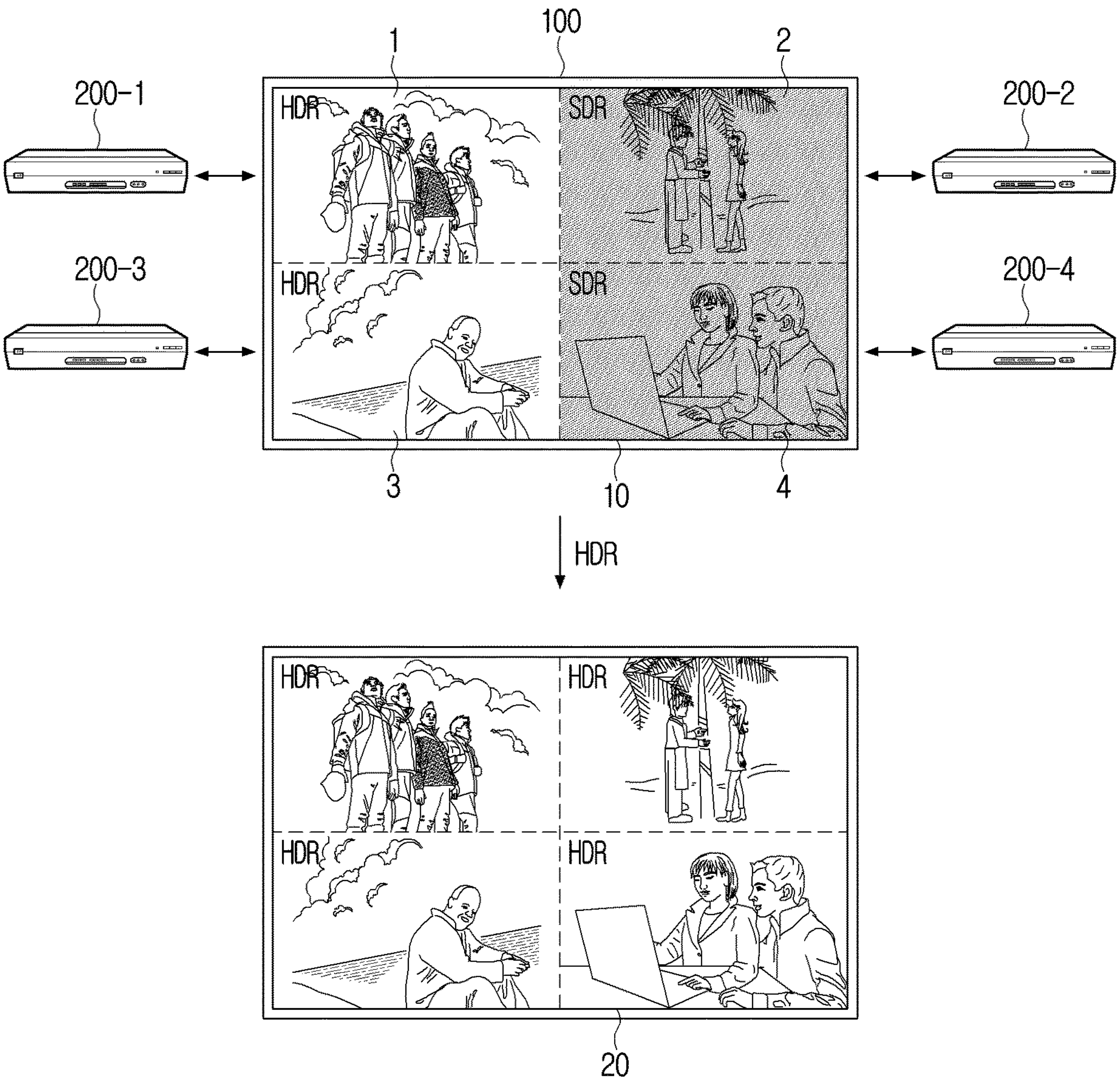
FIG. 4 is a view illustrating an output frame to which HDR processing is applied according to an embodiment.

FIG. 4 is a view illustrating an output frame to which HDR processing is applied according to an embodiment.

The processor 130 may obtain the frame 10 by positioning the content received from each of the plurality of source devices 200 in different areas within the screen of the display 110.

The processor 130 may obtain an output frame 20 to which HDR processing is applied by performing tone mapping based on luminance information on each content included in the frame 10. According to an embodiment, the luminance information may be predetermined.

For example, the processor 130 may obtain the output frame 20 to which HDR processing is applied by performing guide tone mapping on the frame 10 based on predetermined luminance information by a frame unit. The guide tone mapping may refer to a tone mapping curve, a tone mapping algorithm, etc. stored in the display apparatus 10 in order to apply HDR processing to the frame 10, rather than metadata included in HDR content. For example, the tone mapping curve or the tone mapping algorithm may be stored in the display apparatus 10.

As shown in the upper part of FIG. 4, if any one of the content received from the plurality of source devices 200 is HDR content, the processor 130 may obtain luminance information from metadata included in the HDR content. The processor 130 may obtain the content to which HDR processing is applied by performing tone mapping on the HDR content based on the luminance information.

The processor 130 may position the content to which the HDR processing is applied in one area (e.g., the first area) of the screen of the display 110.

The processor 130 may perform tone mapping on the HDR content to obtain the content to which the HDR process is applied, and may position the content to which the HDR process is applied in one area of the screen. In addition, the processor 130 may position the SDR content in the remaining area of the screen without HDR processing. The processor 130 according to an embodiment may obtain the frame 10 by positioning the content received from each of the plurality of source devices 200 in different areas within the screen. As described above, as shown in the upper part of FIG. 4, content to which HDR processing is applied or SDR content may be mixed in the frame 10.

As shown in the lower part of FIG. 4, the processor 130 may obtain an output frame 20 to which HDR processing is applied by performing tone mapping based on predetermined luminance information on content included in the frame 10. For example, the processor 130 may obtain an output frame 20 to which HDR processing is applied by performing tone mapping based on predetermined luminance information on each of the different content included in the frame 10.

The output frame 20 may be a frame obtained by performing tone mapping based on predetermined luminance information on each of the HDR-processed content and the SDR content included in the frame 10.

As shown in the lower part of FIG. 4, since HDR processing is applied to both the SDR content and the HDR content, the output frame 20 may not have a feature in which the HDR content (for example, the first content 1, etc.) is relatively bright and the SDR content (for example, the second content 2, etc.) is relatively dark. Instead, each of the plurality of HDR contents may be expressed within the same or similar luminance range (e.g., up to 1,000 nits).

The processor 130 may control the display 110 to display the output frame 20.

Figure 5:
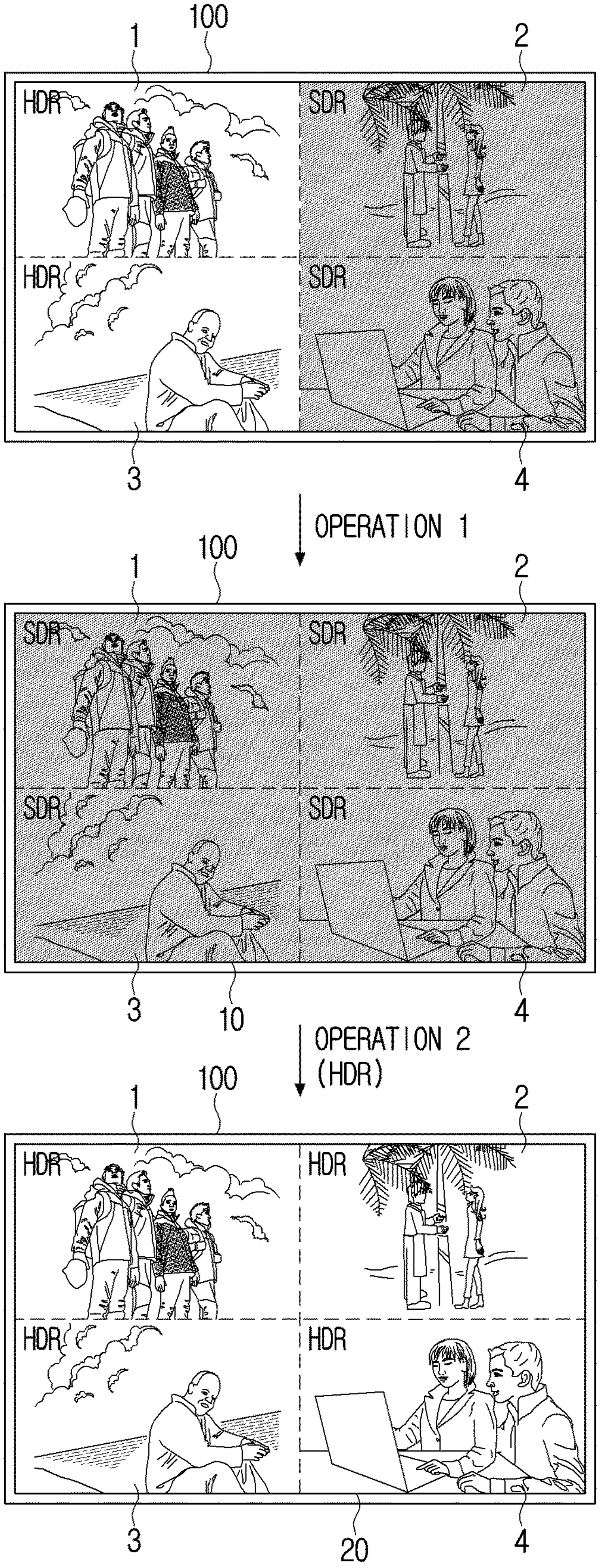
FIG. 5 is a view illustrating an output frame to which HDR processing is applied according to another embodiment.

FIG. 5 is a view illustrating an output frame to which HDR processing is applied according to another embodiment.

Referring to FIGS. 4 and 5, the processor 130 may identify a setting, which indicates whether to perform HDR processing in the multi-view mode. For example, if it is identified that HDR processing is set in the multi-view mode, the processor 130 may perform tone mapping on the frame 10 before outputting the frame 10 as shown at the lower part of FIG. 4 to obtain the output frame 20 to which HDR processing is performed.

According to another example, when it is identified that HDR processing is not set in the multi-view mode, the processor may provide the frame 10 in which the HDR content and the SDR content are mixed as the output frame 20 through the display 110.

According to another embodiment, when it is identified that HDR processing is not set in the multi-view mode, the processor 130 may not output the frame 10 in which the HDR content and the SDR content are mixed as it is, but rather output an image after processing the image by frame unit based on the frame 10.

For example, if any one of the content received from the plurality of source devices 200 is HDR content, the processor 130 may position the corresponding content on an area (e.g., first area) without performing tone mapping on the corresponding content. That is, even if any one of the content received from the plurality of source devices 200 is HDR content, the processor 130 may not perform HDR processing, such as, tone mapping on the corresponding content. Accordingly, the processor 130 may obtain the frame 10 including only a plurality of SDR contents, and may obtain the corresponding frame 10 as the output frame 20.

In this configuration, the output frame 20 may not have a feature that HDR content (for example, the first content 1, etc.) is relatively bright and SDR content (for example, the second content 2, etc.) is relatively dark since HDR content and SDR content are mixed, but each of the plurality of HDR contents may be expressed within the same or similar luminance range (e.g., up to 1,000 nits).

According an embodiment illustrated in FIG. 5, in operation 1, when it is identified that HDR processing is set in the multi-view mode, and at least one of the plurality of contents is identified as SDR content, the processor 130 may obtain the frame 10 including the SDR content corresponding to each of the plurality of contents received in different areas, that is, the frame 10 including the plurality of SDR contents.

In operation 2 shown in FIG. 5, the processor 130 may obtain the output frame 20 to which HDR processing is applied by performing tone mapping based on predetermined luminance information on the frame 10 including the plurality of SDR contents.

The output frame 20 obtained by the processor 130 in operation 2 of FIG. 5 may not be a frame in which HDR content and SDR content are mixed, but each of the plurality of SDR content may be expressed in the same or similar luminance range (e.g., up to 1,000 nits).

Figure 6:
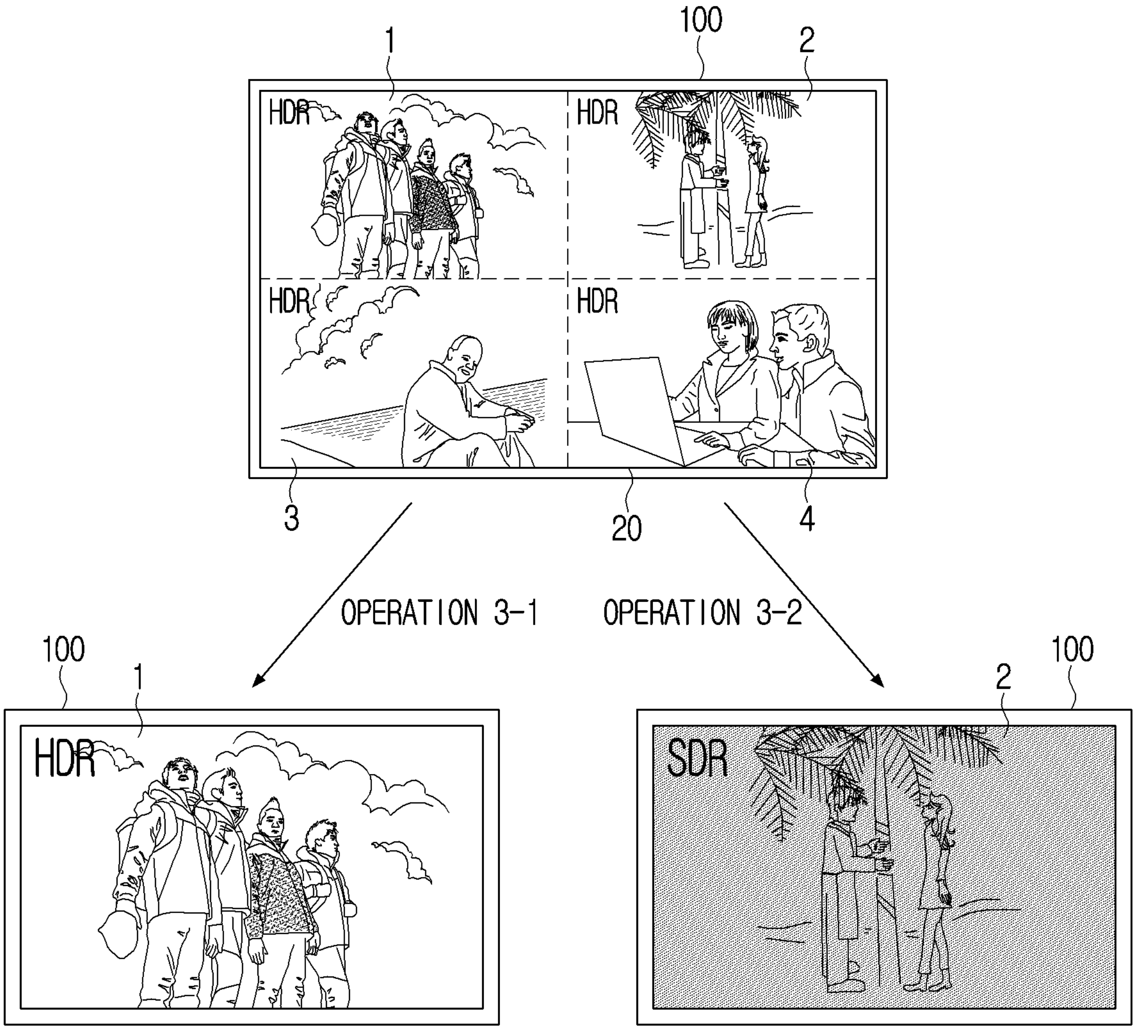
FIG. 6 is a view illustrating a full-view mode according to an embodiment.

FIG. 6 is a view illustrating a full-view mode according to an embodiment.

Referring to FIG. 6, the display apparatus 100 may be switched from a multi-view mode in which a plurality of content is simultaneously provided to a full-view mode in which one content is provided according to the user's control command, content type, or other settings.

In operation 3-1 of FIG. 6, when the multi-view mode is switched to the full-view mode, the processor 130 may identify a type of content selected by the user from among the content received from each of the plurality of source devices 200.

The content type may refer to either HDR content or SDR content.

For example, when the first content 1 is selected by the user from among the plurality of contents, the processor 130 may identify a type of the first content 1.

According to an embodiment, when the type of the first content 1 is identified as HDR content, the processor 130 may obtain luminance information from metadata included in the HDR content, and perform tone mapping for the HDR content based on luminance information.

A content frame corresponding to the content to which the tone mapping is performed, that is, to which the HDR processing is applied, may be displayed on the entire screen. In this case, the display apparatus 100 may display only one content (e.g., the first content 1) in the full-view mode. Also, the processor 130 may obtain and output HDR content by performing tone mapping on the first content 1 using metadata included in the first content 1.

For another example, when the second content 2 is selected by the user from among the plurality of content, the processor 130 may identify a type of the second content 2.

According to an embodiment, in operation 3-2 of FIG. 6, when the type of the second content 2 is identified as SDR content, the processor 130 may display the content frame corresponding to the SDR content on the entire screen without a tone mapping process.

For another example, the processor 130 may obtain an output frame to which HDR processing is applied by performing tone mapping based on predetermined luminance information on the content frame corresponding to the SDR content and provide it through the display 110. The content frame refers to a frame including one content or an output frame in the full-view mode, not the multi-view mode, and may be referred to as a content screen or the like.

Figure 7:
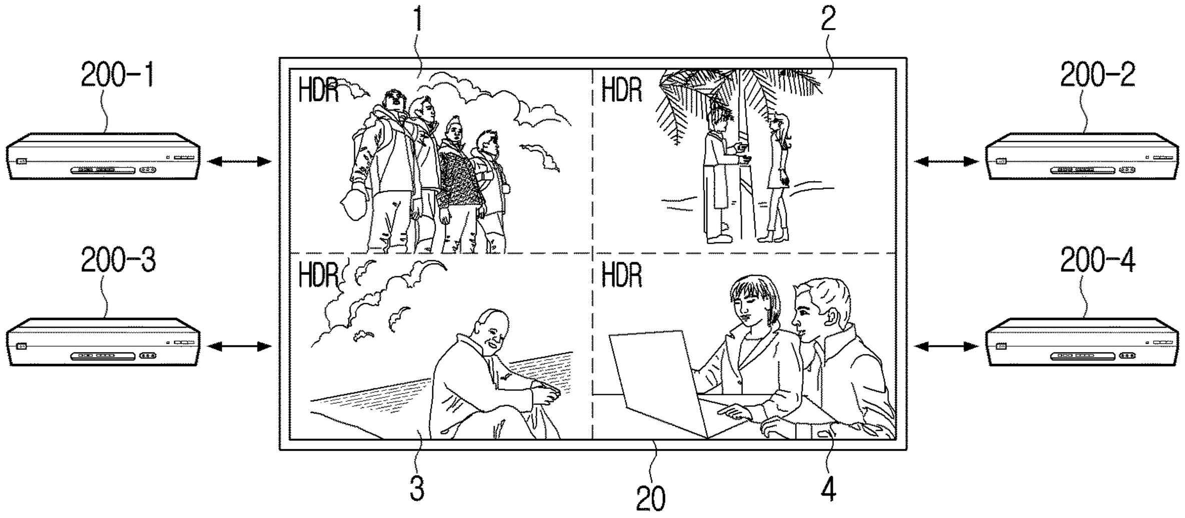
FIG. 7 is a view illustrating a frame including HDR content according to an embodiment.

FIG. 7 is a view illustrating a frame including HDR content according to an embodiment.

Referring to FIG. 7, when content received from each of the plurality of source devices 200 is identified as HDR content, the processor 130 may perform tone mapping on each of the plurality of content regardless of whether HDR processing is set or not, and thus obtain a frame 10 including a plurality of HDR contents and provide the frame 10 as an output frame 20.

For example, when it is identified that HDR processing is set, the processor 130 may identify a type of content received from each of the plurality of source devices 200, and when each of the plurality of content is HDR content, the processor 130 may obtain the frame 10 including the plurality of HDR contents as the output frame 20 without additional image processing (e.g., a process of performing tone mapping) on the frame 10.

According to another embodiment, the processor 130 may identify the type of content received from each of the plurality of source devices 200, and if each of the plurality of content is HDR content, the processor 130 may obtain the frame 10 including the plurality of HDR contents as the output frame 20 without a process of identifying a setting for whether to perform HDR processing in the multi-view mode.

Accordingly, the process of identifying the setting for HDR processing may precede or follow the process of identifying the type of content.

FIG. 8 is a view illustrating a tone mapping curve according to an embodiment.

The processor 130 according to an embodiment of the disclosure may perform tone mapping based on luminance information predetermined in the frame 10.

For example, as for the processor 130, the tone mapping curve may be referred to as luminance information, a gamma curve, or a Peak Luminance Control (PLC) curve. Hereinafter, the tone mapping curve will be referred to as luminance information for convenience of description.

According to an embodiment of the disclosure, the display apparatus 100 may include the plurality of predetermined luminance information.

The processor 130 may identify any one of the plurality of predetermined luminance information based on the frame 10 including each content received in different areas.

For example, the processor 130 may identify predetermined luminance information corresponding to an average picture level (hereinafter, referred to as "APL") of a frame.

The average picture level may be an average graduation value of the frame 10. A higher APL may indicate a relatively bright image, and a lower APL may indicate a relatively dark image.

According to FIG. 8, the display apparatus 100 may pre-store output luminance information (hereinafter, predetermined luminance information) for each graduation according to luminance information (or brightness information) of the frame 10.

For example, in the table shown in FIG. 8, output luminance (Nits) information for each graduation according to an average brightness (e.g., APL) of the frame 10 may be previously stored.

For example, in the case of an 8-bit image, since gradation is expressed as an integer of 0 to 255, predetermined luminance information indicating output luminance information according to luminance information (e.g., APL) of the frame 10 for each gradation of 0 to 255 may be stored.

The predetermined luminance information described above is only an example for performing tone mapping and is not limited thereto. For example, the processor 130 may obtain the output frame 20 to which HDR processing is applied by performing tone mapping by frame basis on the frame 10 based on various algorithms.

Returning back to FIG. 2, the display apparatus 100 according to an embodiment of the disclosure may further include a memory.

The memory may store data required for various embodiments of the disclosure. In this case, the memory may be implemented in a form of a memory embedded in the display apparatus 100 or may be implemented in a form of a memory that is detachable to the display apparatus 100 according to a data storage purpose.

For example, data for driving the display apparatus 100 may be stored in a memory embedded in the display apparatus 100, and data for an extended function of the display apparatus 100 may be stored in a memory attached to and detached from the display apparatus 100. The memory embedded in the display apparatus 100 may be implemented as at least one of a volatile memory (e.g., dynamic RAM (DRAM), static RAM (SRAM), or synchronous dynamic RAM (SDRAM)), non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD). Also, the memory detachable from the display apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to the USB port (e.g., USB memory), or the like.

According to an embodiment, the memory may store at least one instruction for controlling the display apparatus 100 or a computer program including the instructions.

According to another embodiment, the memory may store information about an artificial intelligence model including a plurality of layers. In this configuration, storing information about the artificial intelligence model may refer to storing various information related to the operation of the artificial intelligence model, for example, information on a plurality of layers included in the artificial intelligence model, information on parameters used in each of the plurality of layers (for example, filter coefficients, bias, etc.). For example, the memory may store a neural network model according to an embodiment of the disclosure.

According to an embodiment, the neural network model according to an embodiment of the disclosure may be a model learned to output a frame on which tone mapping is performed based on predetermined luminance information corresponding to luminance information of an input frame.

For example, the neural network model may be a model learned to output a frame to which HDR processing is applied by performing tone mapping according to luminance information of a plurality of frames as learning data.

According to an embodiment of the disclosure, learning the artificial intelligence model may mean that a basic artificial intelligence model (for example, an artificial intelligence model including an arbitrary random parameter) is learned using a plurality of training data by a learning algorithm, and thus a predefined action rule or artificial intelligence model set to perform a desired characteristic (or purpose) is generated. Such learning may be performed through a separate server and/or system, but is not limited thereto, and may be performed in the display apparatus 100. Examples of the learning algorithm include, for example, and without limitation, supervised learning, unsupervised learning, semi-supervised learning, transfer learning or reinforcement learning, but are not limited to the examples described above.

Each of the artificial intelligence models may be implemented as, for example, convolutional neural network (CNN), deep neural network (DNN), recurrent neural network (RNN), restricted Boltzmann machine (RBM), deep belief network (DBN), bidirectional recurrent deep neural network (BRDNN) and deep Q-networks, but is not limited to the example described above.

The processor 130 for executing the artificial intelligence model according to an embodiment of the disclosure may be implemented through a combination of a general-purpose processor such as, for example, and without limitation, a general-purpose processor such as a CPU, AP, or a digital signal processor (DSP), a graphics-only processor such as a GPU, a vision processing unit (VPU), or an artificial intelligence-only processor such as an NPU. The processor 130 may control to process input data according to a predefined operation rule or an artificial intelligence model stored in the memory. Alternatively, when the processor 130 is dedicated processor (or artificial intelligence dedicated processor) the dedicated processor may be designed with a hardware structure specialized for processing a specific artificial intelligence model. For example, hardware specialized for processing a specific artificial intelligence model may be designed as a hardware chip such as an ASIC or FPGA. When the processor 130 is implemented as a dedicated processor, it may be implemented to include a memory for implementing an embodiment of the disclosure, or may be implemented to include a memory processing function for using an external memory.

According to another example, the memory may store information about an artificial intelligence model including a plurality of layers. In this configuration, storing information about the artificial intelligence model may refer to storing various information related to the operation of the artificial intelligence model, for example, information on a plurality of layers included in the artificial intelligence model, information on parameters used in each of the plurality of layers (for example, filter coefficients, bias, etc.).

Figure 9:
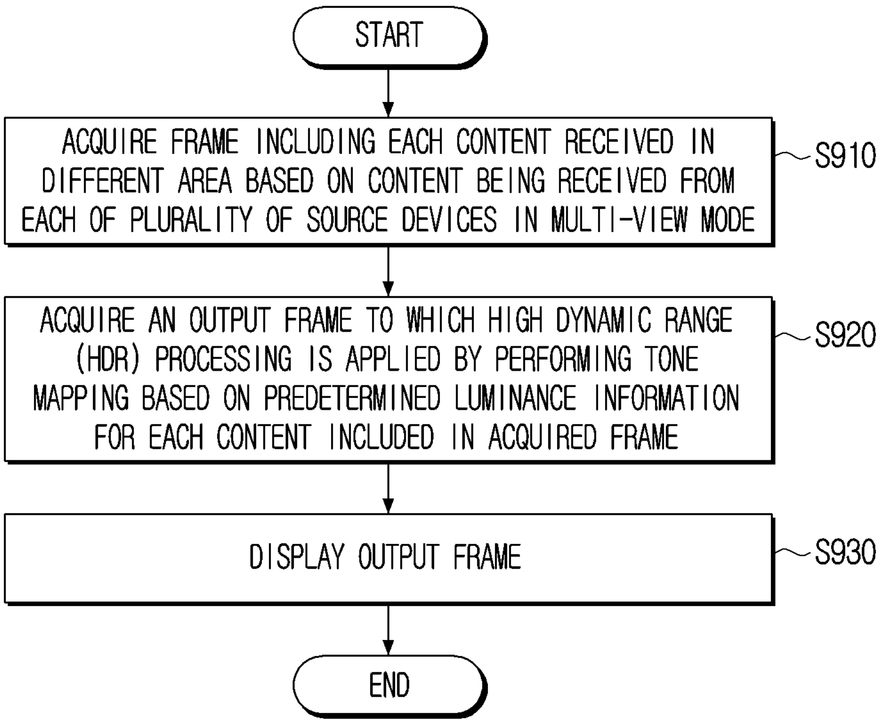
FIG. 9 is a flowchart illustrating a method of controlling a display apparatus according to an embodiment.

FIG. 9 is a flowchart illustrating a method of controlling a display apparatus according to an embodiment.

A method of controlling a display apparatus according to an embodiment of the disclosure include obtaining a frame including each content received in a different area when content is received from each of a plurality of source devices in a multi-view mode (S910).

An output frame to which High Dynamic Range (HDR) processing is applied may be obtained by performing tone mapping based on predetermined luminance information for each content included in the obtained frame to (S920).

The output frame may be displayed (S930).

The operation S920 of obtaining the output frame may include identifying a setting for whether to perform HDR processing in the multi-view mode, when it is identified that HDR processing is set, obtaining an output frame to which HDR processing is applied, when it is identified that HDR processing is not set, identifying whether at least one of the plurality of contents is SDR content, and when it is identified that at least one of the plurality of contents is SDR content, obtaining an output frame including the plurality of SDR contents.

The operation S920 of obtaining the output frame may include obtaining an output frame including a plurality of HDR contents when it is identified that HDR processing is not set and each of the plurality of contents is identified as the HDR content.

The operation S920 of obtaining the output frame may include obtaining luminance information from metadata included in at least one HDR content among content received from a plurality of source devices, performing tone mapping for the HDR content based on the luminance information, obtaining a frame including HDR content on which tone mapping is performed, and obtaining an output frame by applying HDR processing to the frame based on predetermined luminance information.

The operation S910 of obtaining the frame may include obtaining a frame including each of the SDR content received in different areas when each of the contents received from the plurality of source devices is identified as SDR content, and the operation S920 of obtaining may include obtaining an output frame to which HDR processing is applied by performing tone mapping based on predetermined luminance information on each of the SDR content included in the obtained frame.

The control method according to an embodiment of the disclosure may further include identifying a type of content selected by the user from among content received from each of a plurality of source devices when the multi-view mode is switched to the full-view mode, obtaining luminance information from metadata included in the HDR content when the content is HDR content, performing tone mapping on the HDR content based on the luminance information, and displaying the content frame on which the tone mapping is performed.

The control method according to an embodiment may further include identifying the type of content selected by the user from among the content received from each of a plurality of source devices when the multi-view mode is switched to the full-view mode, and displaying a frame corresponding to the SDR content when the content is SDR content.

The operation S920 of obtaining the output frame may include identifying predetermined luminance information corresponding to the luminance information of the obtained frame from among a plurality of predetermined luminance information, and obtaining an output frame to which HDR processing is applied by performing tone mapping on each content included in an obtained frame based on the identified predetermined luminance information.

The operation S920 of obtaining the output frame may include obtaining an output frame to which HDR processing is applied by inputting the obtained frame into a neural network mode, wherein the neural network model may be a model learned to output a frame on which tone mapping is performed based on predetermined luminance information corresponding to luminance information of an input frame.

However, various embodiments of the disclosure may be applied to all types of electronic apparatuses capable of receiving a voice signal as well as electronic apparatuses.

Various example embodiments described above may be embodied in a recording medium that may be read by a computer or a similar apparatus to the computer using software, hardware, or a combination thereof. In some cases, the embodiments described herein may be implemented by the processor itself. In a software configuration, various embodiments described in the specification such as a procedure and a function may be implemented as separate software modules. The software modules may respectively perform one or more functions and operations described in the disclosure According to various embodiments described above, computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the sound output device according to the various embodiments described above when executed by the processor of the particular device.

The non-transitory computer readable recording medium may refer, for example, to a medium that stores data and that can be read by devices. For example, the non-transitory computer-readable medium may be CD, DVD, a hard disc, Blu-ray disc, USB, a memory card, ROM, or the like.

The foregoing embodiments and advantages are merely examples and are not to be construed as limiting the disclosure. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A display apparatus comprising:
a display;
a communication interface comprising circuitry; and
a processor configured to:
based on a plurality of contents comprising at least one High Dynamic Range (HDR) content and one or more other contents received from a plurality of source devices through the communication interface in a multi-view mode, obtain a first frame by positioning each of the received plurality of contents in different areas of the display, the one or more other contents including Standard Dynamic Range (SDR) content;
obtain first luminance information on each of the plurality of contents included in the first frame;
perform tone mapping on the at least one HDR content based on the first luminance information and apply HDR processing on the at least one HDR content;
perform tone mapping on each of the one or more other contents based on the first luminance information and apply HDR processing on the one or more other contents;
obtain a second frame comprising the at least one HDR content on which the tone mapping is performed and to which HDR processing is applied and the one or more other contents on which the tone mapping is performed and to which HDR processing is applied, and
control the display to display the second frame.

2. The display apparatus of claim 1, wherein the processor is further configured to:
identify setting information indicating whether the HDR processing is set in the multi-view mode,
based on the setting information indicating that the HDR processing is set, obtain the second frame to which the HDR processing is applied, and based on the setting information indicating that the HDR processing is not set, identify whether at least one of the plurality of contents is SDR content, and
based on identifying that at least one of the plurality of contents is SDR content, obtain a third frame including a plurality of SDR contents.

3. The display apparatus of claim 1, wherein the processor is further configured to, based on the multi-view mode being switched to a full-view mode, identify a type of content selected by a user among the plurality of contents received from the plurality of source devices,
based on the type of content being HDR content, obtain second luminance information from metadata included in the HDR content,
perform the tone mapping on the HDR content based on the second luminance information, and
control the display to display the HDR content on which the tone mapping is performed.

4. The display apparatus of claim 1, wherein the processor is further configured to, based on the multi-view mode being switched to a full-view mode, identify a type of content selected by a user among the plurality of contents received from each of the plurality of source devices, and
based on the type of content being SDR content, control the display to display the frame corresponding to the SDR content.

5. The display apparatus of claim 1, wherein the processor is further configured to identify the first luminance information corresponding to a second luminance information of the first frame from among a plurality of predetermined luminance information.

6. The display apparatus of claim 1, wherein the processor is further configured to obtain the second frame to which the HDR processing is applied by inputting the first frame to a neural network model, and
wherein the neural network model is a model learned to output a frame on which tone mapping is performed based on the first luminance information corresponding to input luminance information of an input frame.

7. The display apparatus of claim 1, wherein the plurality of contents comprises first content and second content, wherein the second frame comprises the first content and the second content, and wherein the first content is obtained by performing the tone mapping based on the first luminance information on each of the first content and the second content.

8. A method of controlling a display apparatus comprising:

based on a plurality of contents comprising at least one High Dynamic Range (HDR) content and one or more other contents received from a plurality of source devices in a multi-view mode, obtaining a first frame by positioning each of the received plurality of contents in different areas of a display of the display apparatus, the one or more other contents including Standard Dynamic Range (SDR) content;

obtaining first luminance information on each of the plurality of contents included in the first frame;

performing tone mapping on the at least one HDR content based on the first luminance information and apply HDR processing on the at least one HDR content;

performing tone mapping on each of the one or more other contents respectively based on the first luminance information and apply HDR processing on the one or more other contents;

obtaining a second frame comprising the at least one HDR content on which the tone mapping is performed and to which HDR processing is applied and the one or more other contents on which the tone mapping is performed and to which HDR processing is applied; and displaying the second frame.

9. The method of claim 8, wherein the obtaining the second frame comprises:

identifying setting information indicating whether the HDR processing is set in the multi-view mode;

based on the setting information indicating that the HDR processing is set, obtaining the second frame to which the HDR processing is applied; and based on the setting information indicating that the HDR processing is not set, identifying whether at least one of the plurality of contents is SDR content, and based on identifying that at least one of the plurality of contents is SDR content, obtaining a third frame including a plurality of SDR contents.

10. The method of claim 9, further comprising:

based on the multi-view mode being switched to a full-view mode, identifying a type of content selected by a user among the plurality of contents received from the plurality of source devices;

based on the type of content being HDR content, obtaining second luminance information from metadata included in the HDR content;

performing the tone mapping on the HDR content based on the second luminance information; and displaying the HDR content on which the tone mapping is performed.

11. The method of claim 9, further comprising:

based on the multi-view mode being switched to a full-view mode, identifying a type of content selected by a user among the plurality of contents received from each of the plurality of source devices, and based on the type of content being SDR content, displaying the frame corresponding to the SDR content.

12. The method of claim 9, wherein the obtaining the second frame comprises:

identifying the first luminance information corresponding to a second luminance information of the first frame from among a plurality of predetermined luminance information.

13. The method of claim 9, wherein the obtaining the second frame comprises obtaining the second frame to which the HDR processing is applied by inputting the first frame to a neural network model, and wherein the neural network model is a model learned to output a frame on which tone mapping is performed based on the first luminance information corresponding to input luminance information of an input frame.

14. The method of claim 8, wherein the plurality of contents comprises first content and second content, wherein the second frame comprises the first content and the second content, and wherein the first content is obtained by performing the tone mapping based on the first luminance information on each of the first content and the second content.

* * * * *